(12) United States Patent
Anifa

(10) Patent No.: US 9,990,271 B2
(45) Date of Patent: Jun. 5, 2018

(54) AUTOMATICALLY GENERATING OBJECT LOCATORS FOR AUTOMATION TEST GENERATION

(71) Applicant: Accenture Global Solutions Limited, Dublin (IE)

(72) Inventor: Azarudeen Anifa, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 34 days.

(21) Appl. No.: 15/202,906

(22) Filed: Jul. 6, 2016

(65) Prior Publication Data

US 2018/0011779 A1  Jan. 11, 2018

(51) Int. Cl.
G06F 9/44 (2018.01)
G06F 11/00 (2006.01)
G06F 11/36 (2006.01)

(52) U.S. Cl.
CPC .............................. G06F 11/3672 (2013.01)

(58) Field of Classification Search
None
See application file for complete search history.

(56) References Cited

U.S. PATENT DOCUMENTS

| | | | | |
|---|---|---|---|---|
| 7,089,533 B2* | 8/2006 | Vosburgh | ........ | G06F 17/30896 707/E17.118 |
| 7,272,822 B1* | 9/2007 | Riggins | ........ | G06F 9/4443 714/38.14 |
| 7,334,220 B2* | 2/2008 | Chang | ........ | H04L 63/0815 709/224 |
| 8,200,617 B2* | 6/2012 | Spivack | ........ | G06F 17/3087 707/602 |
| 8,341,099 B2* | 12/2012 | Khosravy | ........ | G06Q 10/10 706/12 |
| 8,713,368 B2* | 4/2014 | Lock | ........ | G06F 11/2294 714/25 |
| 8,885,951 B1* | 11/2014 | Cristofano | ........ | H04N 1/00795 382/173 |
| 8,954,438 B1* | 2/2015 | Mao | ........ | G06F 17/30997 707/737 |
| 9,613,149 B2* | 4/2017 | Spivack | ........ | G06F 17/3087 |

(Continued)

OTHER PUBLICATIONS

SeleniumHQ, "Selenium IDE," http://www.seleniumhq.org/projects/ide/, Feb. 9, 2006, 4 pages.

(Continued)

*Primary Examiner* — Wei Zhen
*Assistant Examiner* — Binh Luu
(74) *Attorney, Agent, or Firm* — Harrity & Harrity, LLP

(57) ABSTRACT

A device may receive a uniform resource identifier that identifies an object source. The object source may include one or more objects organized in a hierarchy of objects. The device may identify an object, of the one or more objects, to permit extraction of one or more properties of the object. The device may extract the one or more properties of the object based on identifying the object. The device may select a subset of properties, of the one or more properties, to use to generate an object locator based on extracting the one or more properties. The object locator may be associated with locating the object in the hierarchy of objects. The device may generate the object locator based on selecting the subset of properties of the object.

20 Claims, 8 Drawing Sheets

(56) References Cited

U.S. PATENT DOCUMENTS

| | | | |
|---|---|---|---|
| 9,753,920 B2* | 9/2017 | Elkhou | G06F 17/30011 |
| 2003/0069877 A1* | 4/2003 | Grefenstette | G06F 17/30643 |
| 2012/0203734 A1* | 8/2012 | Spivack | G06F 17/3087 |
| | | | 707/602 |

OTHER PUBLICATIONS

Firebug, "Firebug," http://getfirebug.com/, Jun. 7, 2016, 5 pages.
Wikipedia, "XPath," https://en.wikipedia.org/wiki/XPath, Jun. 2, 2016, 10 pages.
W3C Wiki, "Traversing the DOM," https://www.w3.org/wiki/Traversing_the_DOM, Jul. 15, 2016, 6 pages.
W3C Wiki, "Objects in JavaScript," https://www.w3.org/wiki/Objects_in_JavaScript, Aug. 11, 2012, 8 pages.
Wikipedia, "Document Object Model," https://en.wikipedia.org/wiki/Document_Object_Model, Jun. 28, 2016, 4 pages.
W3Schools, "XML DOM Travers Node Tree," http://www.w3schools.com/xml/dom_nodes_traverse.asp, Feb. 20, 2008, 9 pages.

\* cited by examiner

AUTOMATICALLY GENERATING OBJECT LOCATORS FOR AUTOMATION TEST GENERATION

BACKGROUND

The document object model (DOM) may include a convention for representing and interacting with objects in documents. For example, DOM may be used to represent an object in a hypertext markup language (HTML) document, an extensible markup language (XML) document, or an extensible hypertext markup language (XHTML) document. Objects of a document may be organized in a tree structure called a DOM tree. In some cases, a DOM tree may enable inspection and/or manipulation of objects of the DOM tree. For example, the objects may be inspected and/or manipulated by using methods that operate on the objects of the DOM tree.

SUMMARY

According to some possible implementations, a device may include one or more processors to receive a uniform resource identifier that identifies an object source. The object source may include one or more objects organized in a hierarchy of objects. The one or more processors may identify an object, of the one or more objects, to permit extraction of one or more properties of the object. The one or more processors may extract the one or more properties of the object based on identifying the object. The one or more processors may select a subset of properties, of the one or more properties, to use to generate an object locator based on extracting the one or more properties. The object locator may be associated with locating the object in the hierarchy of objects. The one or more processors may generate the object locator based on selecting the subset of properties of the object.

According to some possible implementations, a non-transitory computer-readable medium may store one or more instructions that, when executed by one or more processors, cause the one or more processors to receive one or more uniform resource identifiers that identify one or more object sources. The one or more object sources may include at least one object, of one or more objects, that represents at least one element of the one or more object sources. The one or more objects may be hierarchically related. The one or more instructions may cause the one or more processors to identify an object, of the one or more objects, using one or more techniques to identify the object. The one or more instructions may cause the one or more processors to extract one or more properties of the object based on identifying the object using the one or more techniques to identify the object. The one or more instructions may cause the one or more processors to select a subset of properties, of the one or more properties, to use to generate an object locator based on extracting the one or more properties. The object locator may enable a device to identify the object in the one or more object sources. The one or more instructions may cause the one or more processors to generate the object locator using the subset of properties of the object.

According to some possible implementations, a method may include receiving, by a device, a uniform resource identifier that identifies an object source. The object source may include one or more objects. The method may include identifying, by the device, an object, of the one or more objects, to permit extraction of one or more properties of the object. The method may include extracting, by the device, the one or more properties of the object based on identifying the object. The method may include selecting, by the device, a subset of properties, of the one or more properties, using a rule. The rule may be associated with determining whether a property, of the one or more properties, can be used to generate an object locator that identifies a location of the object in the object source. The method may include generating, by the device, the object locator based on selecting the subset of properties. The method may include providing, by the device, the object locator to permit the device to generate a test of the object source.

DETAILED DESCRIPTION

The following detailed description of example implementations refers to the accompanying drawings. The same reference numbers in different drawings may identify the same or similar elements.

Metadata of objects of an object source (e.g., a webpage or a document), such as properties of the objects, may be available via the object source. In some cases a developer, such as a web developer, may wish to test the object source. For example, the web developer may wish to test sign-in functionality, navigation functionality, operational functionality, and/or other functionality of the object source. To test the object source, the developer may wish to generate an automation test using the metadata of the objects, so as to enable a device to identify and test the objects of the object source.

Generating the test may include manual capture of the metadata and/or manual generation of object locators, which enable the device to identify the objects. This may be labor intensive, time consuming, error prone, and/or depend on technical skill. Alternatively, generating the test may include using an automatic technique to extract the metadata and/or to generate the object locators. While automatic, a device employing this technique may fail to generate object locators that accurately identify the objects of the object source (e.g., by generating object locators for all extracted metadata rather than generating object locators for selected metadata). Generating object locators that do not accurately identify objects reduces a performance of the test by preventing the device from identifying the object to be tested.

Implementations described herein enable a device to automatically extract metadata of objects from an object source and selectively use the metadata to generate object locators. This enables the device to increase an accuracy of the generated object locators by selecting which metadata to use to generate the object locators. In addition, this conserves computing resources of the device that would have been used to inaccurately identify object locators during the test. Further, this conserves computing and/or memory resources of the device by reducing a quantity of object locators that the device generates and/or stores by causing the device to generate object locators for a subset of the extracted metadata (e.g., rather than generating object locators for all extracted metadata). Further, this may reduce an amount of time for testing an object source by reducing the quantity of object locators generated and/or may reduce an amount of technical skill needed by a developer to test the object source.

Figure 1A:
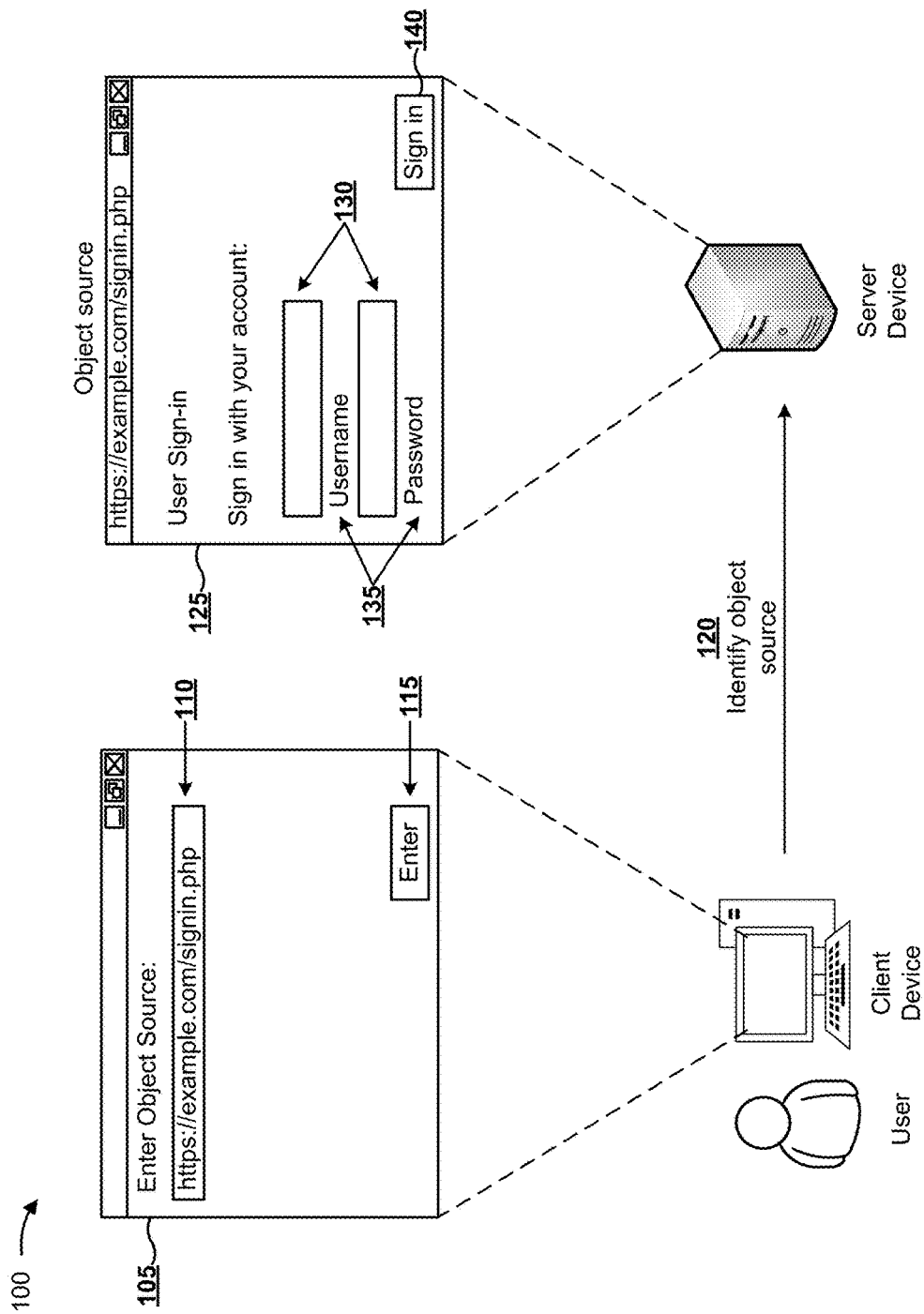
FIGS. 1A-1E are diagrams of an overview of an example implementation described herein.

FIGS. 1A-1E are diagrams of an overview of an example implementation 100 described herein. As shown in FIG. 1A, a client device may display a user interface 105 (e.g., via a display of the client device). As shown by reference number 110, a user of the client device may identify an object source by, for example, inputting a uniform resource locator (URL) for a webpage hosted by a server device. As shown by reference number 115, user interface 105 may include an "Enter" button, selection of which may cause the client device to initiate identification of the object source.

As shown by reference number 120, the client device may identify the object source (e.g., by using the URL input by the user). The client device may identify object source 125, such as a webpage hosted by the server device, as the source of objects. As shown, object source 125 may include two input objects 130, shown as a username text box and a password text box. As further shown, the two input objects 130 may be identified by two label objects 135 that display the text "username" below the username text box, to identify the username text box, and "password" below the password text box, to identify the password text box. As further shown, object source 125 may include a button object 140, such as a sign in button, selection of which may permit a user of object source 125 to sign into an account, sign into a restricted webpage of a website, access particular functionality of the webpage, or the like.

Figure 1B:
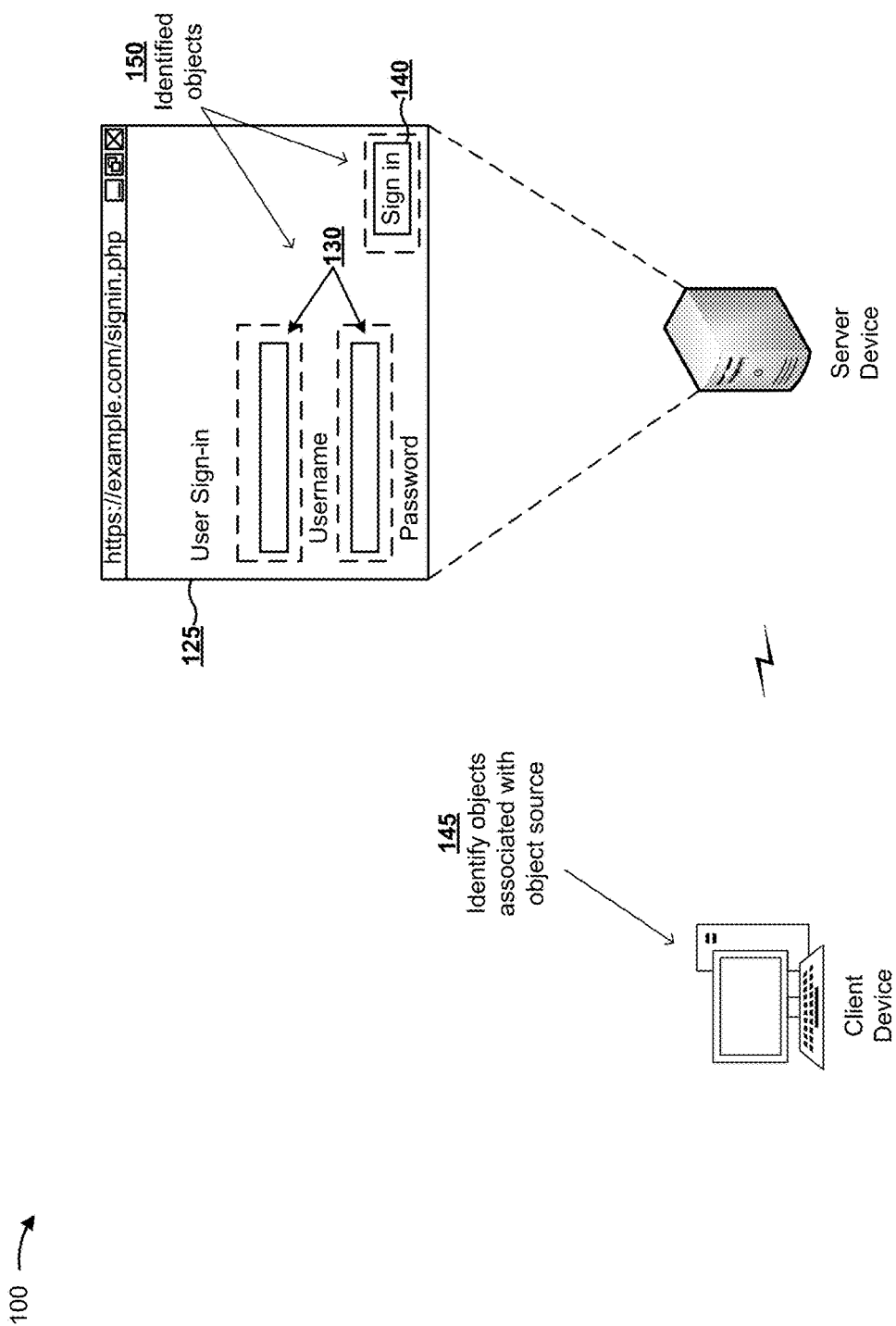

As shown in FIG. 1B, and by reference number 145, the client device may identify objects associated with object source 125. For example, as shown by reference number 150, the client device may identify input objects 130 and button object 140 as objects of object source 125, as indicated by the dashed line around input objects 130 and button object 140.

Figure 1C:
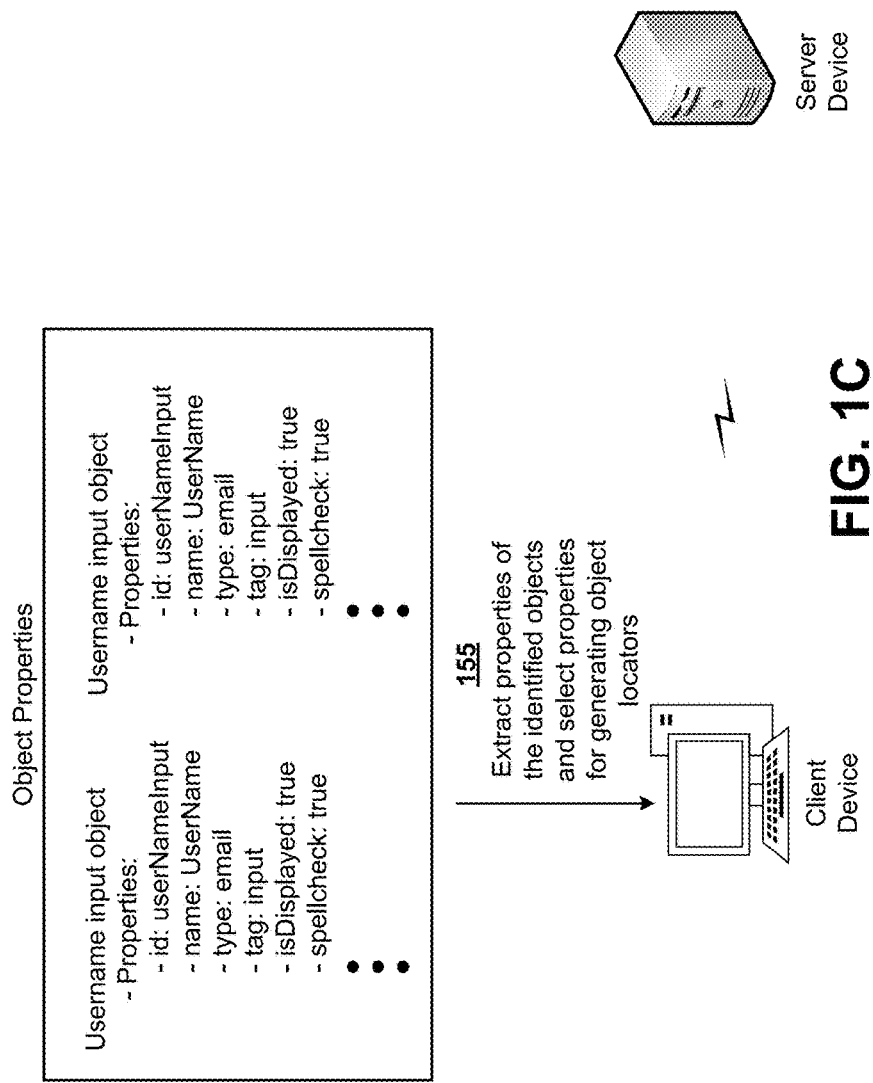

As shown in FIG. 1C, and by reference number 155, the client device may extract properties of the identified objects and select properties for generating object locators. For example, the client device may identify properties that include an identifier property (e.g., shown as "id"), a name property, a type property, and/or a tag property of the username input object and the password input object. The client device may further identify attributes of the properties for the identified objects, such as a value for the id, name, type, and/or tag properties.

The client device may select particular properties, of the extracted properties, to use to generate object locators for the identified objects. For example, the client device may select properties by identifying properties that enable the client device to generate more accurate object locators. For example, the client device may select properties that enable the client device to more accurately identify the object within object source 125, such as properties that uniquely identify the object, relative to other properties, as described in more detail elsewhere herein. For FIGS. 1C-1E, assume that the client device has selected the id and name properties as the properties to use to generate the object locators and has not selected the type, the tag, the isDisplayed, and/or the spellcheck properties to use to generate the object locators.

Figure 1D:
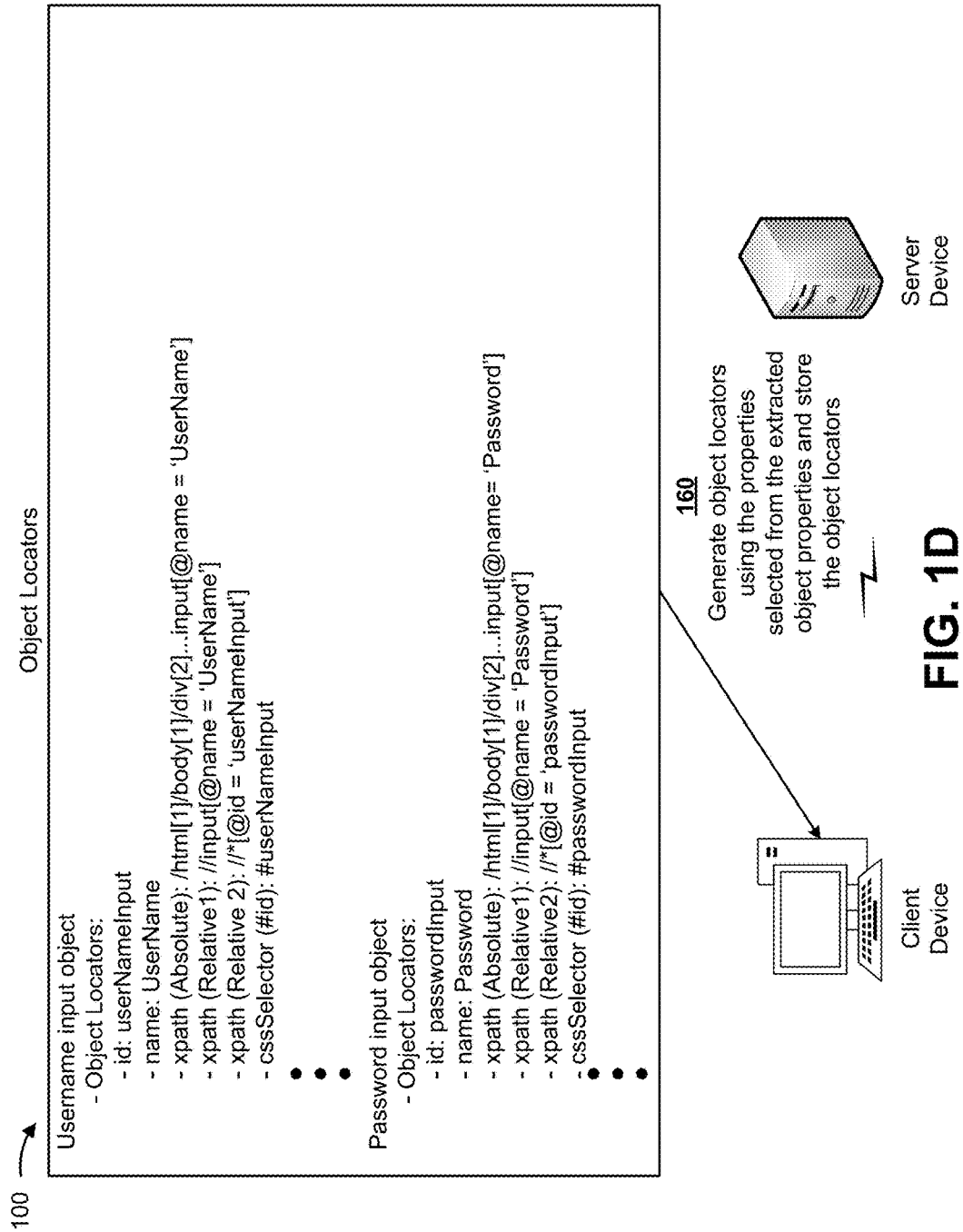

As shown in FIG. 1D, and by reference number 160, the client device may generate object locators using the properties selected from the extracted object properties and may store the object locators. For example, the client device may generate object locators by using particular properties as object locators (e.g., the id and/or name properties). As another example, the client device may generate object locators that include the properties (e.g., by generating absolute and/or relative xpaths that include the id and/or name properties). As another example, the client device may generate object locators using cascading style sheet (CSS) selectors (e.g., the class selector, which selects objects of a class, or the #id selector, which selects objects with a particular identifier property), shown as "cssSelector." The client device may not generate object locators for unselected properties. For example, the client device may not generate object locators for the isDisplayed property and/or the spellcheck property. This conserves computing and/or processing resources of the client device by decreasing a quantity of object locators that the client device generates. The client device may store the object locators, such as in an object repository, in association with generating the object locators.

Figure 1E:
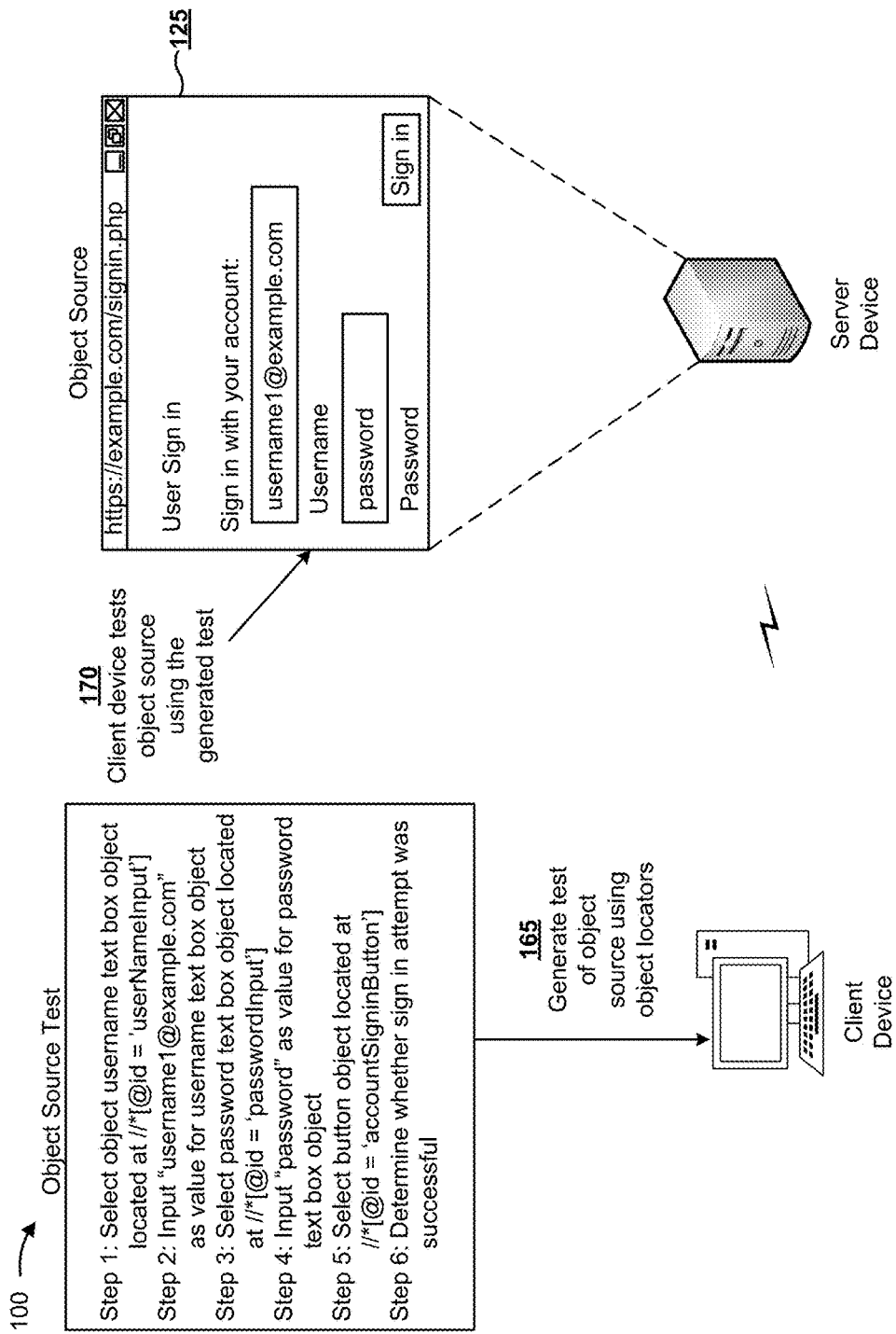

As shown in FIG. 1E, and by reference number 165, the client device may generate a test of the object source using the object locators. The client device may generate a test that includes one or more test steps to test the operation of the objects of object source 125. For example, the client device may generate a test that tests what values input objects 130 can receive, whether button object 140 submits the input to the server device, and whether a sign in attempt was successful. When generating the test, the client device may include the object locators in the test steps to enable the client device to identify which objects to test at each test step and to locate the objects within object source 125. For example, the client device may include an xpath object locator for the username input object in steps 1 and 2 to instruct the client device to test the username input object, to enable the client device to locate the username input object in object source 125, and to cause the client device to enter the value "username" into the username input object.

As shown by reference number 170, the client device may test object source 125 using the generated test. For example, the client device may test object source 125 by inputting the value "username" into the username input object, inputting the value "password" into the password input object, and selecting the sign in button object. The client device may determine whether the test was successful (e.g., whether a sign in attempt was successful). The client device may provide results of the test for display to a user (e.g., results that indicate whether the sign in attempt was successful).

In this way, a client device may automatically extract properties of objects from an object source and selectively use the properties to generate object locators for the objects. This conserves computing and/or memory resources by reducing a quantity of object locators that the client device generates and/or stores. In addition, this increases an efficiency of testing the object source by enabling the client device to select and use properties that enable generation of more accurate object locators (e.g., relative to using other properties to generate the object locators), thereby conserving computing resources that would otherwise be used to inaccurately identify objects during testing.

As indicated above, FIGS. 1A-1E are provided merely as an example. Other examples are possible and may differ from what was described with regard to FIGS. 1A-1E.

Figure 2:
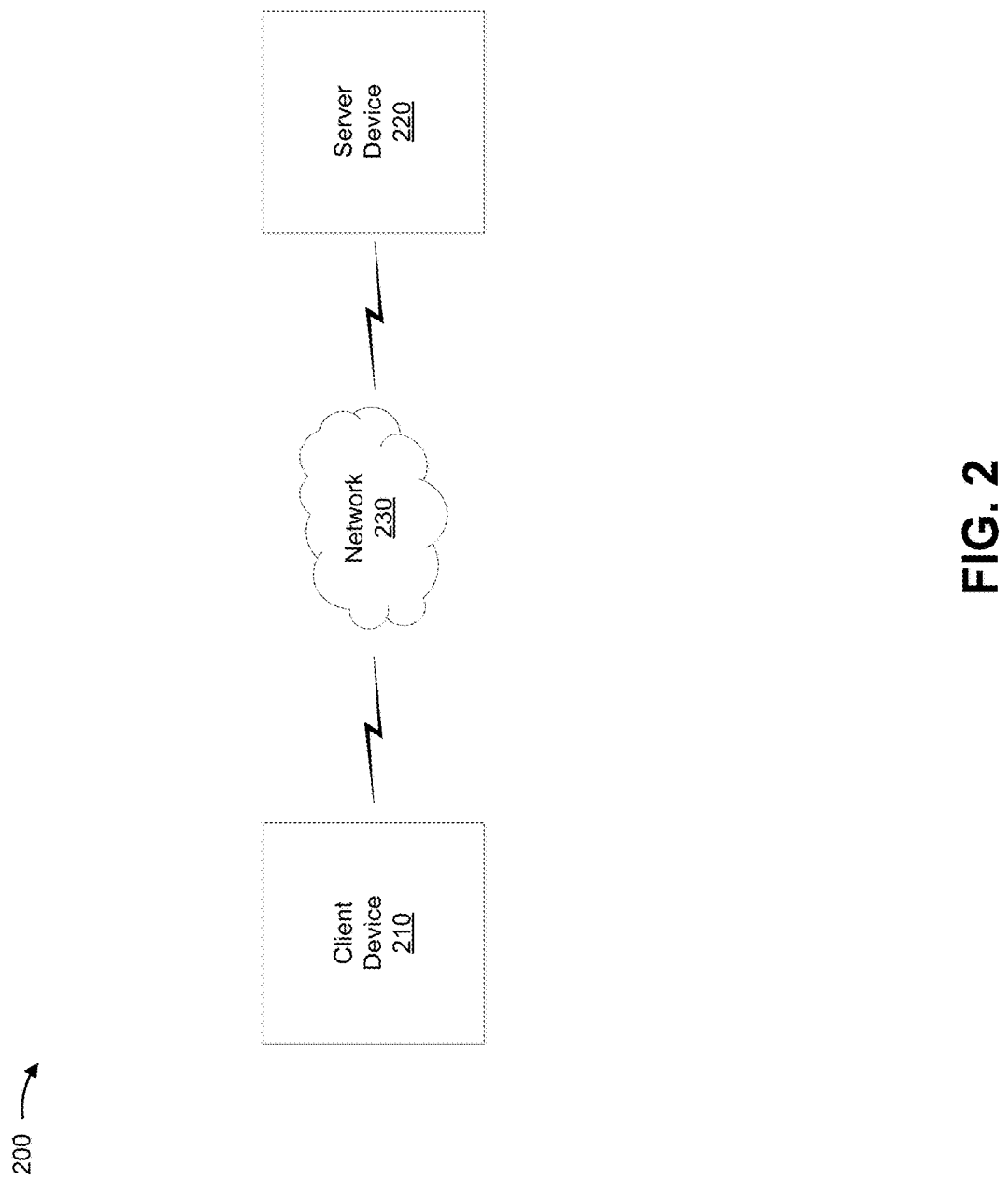
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 includes one or more devices capable of receiving, generating, storing, processing, and/or providing information associated with automatically generating object locators for objects of an object source. For example, client device 210 may include a communication and/or computing device, such as a desktop computer, a laptop computer, a tablet computer, a server device, a mobile phone (e.g., a smart phone or a radiotelephone), a wearable communication device (e.g., a smart wristwatch or a pair of smart eyeglasses), or a similar type of device. In some implementations, client device 210 may extract properties of objects and select particular properties to generate object locators, as described elsewhere herein. Additionally, or alternatively, client device 210 may generate object locators for objects from an object source using the selected properties, as described elsewhere herein. In some implementations, client device 210 may communicate with server device 220 to identify objects and/or to extract properties of the objects, as described elsewhere herein.

Server device 220 includes one or more devices capable of receiving, storing, processing, and/or providing information associated with generating object locators for an object of an object source. For example, server device 220 may include a server or a group of servers. In some implementations, server device 220 may store or host an object source, as described elsewhere herein. Additionally, or alternatively, server device 220 may generate tests using object locators generated by client device 210, as described elsewhere herein. In some implementations, server device 220 may communicate with client device 210 to enable client device 210 to identify objects and/or to extract properties of the objects, as described in more detail elsewhere herein.

Network 230 includes one or more wired and/or wireless networks. For example, network 230 may include a cellular network (e.g., a long-term evolution (LTE) network, or a 3G network, a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
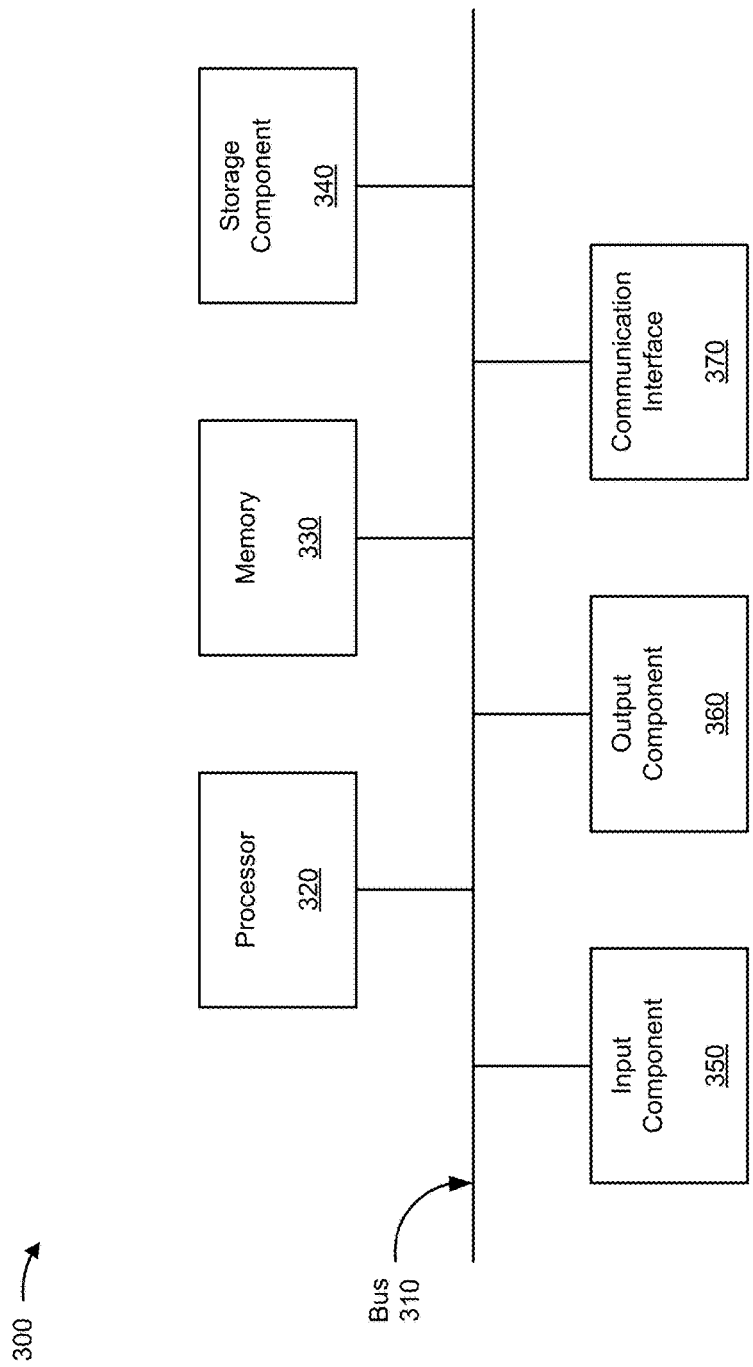
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
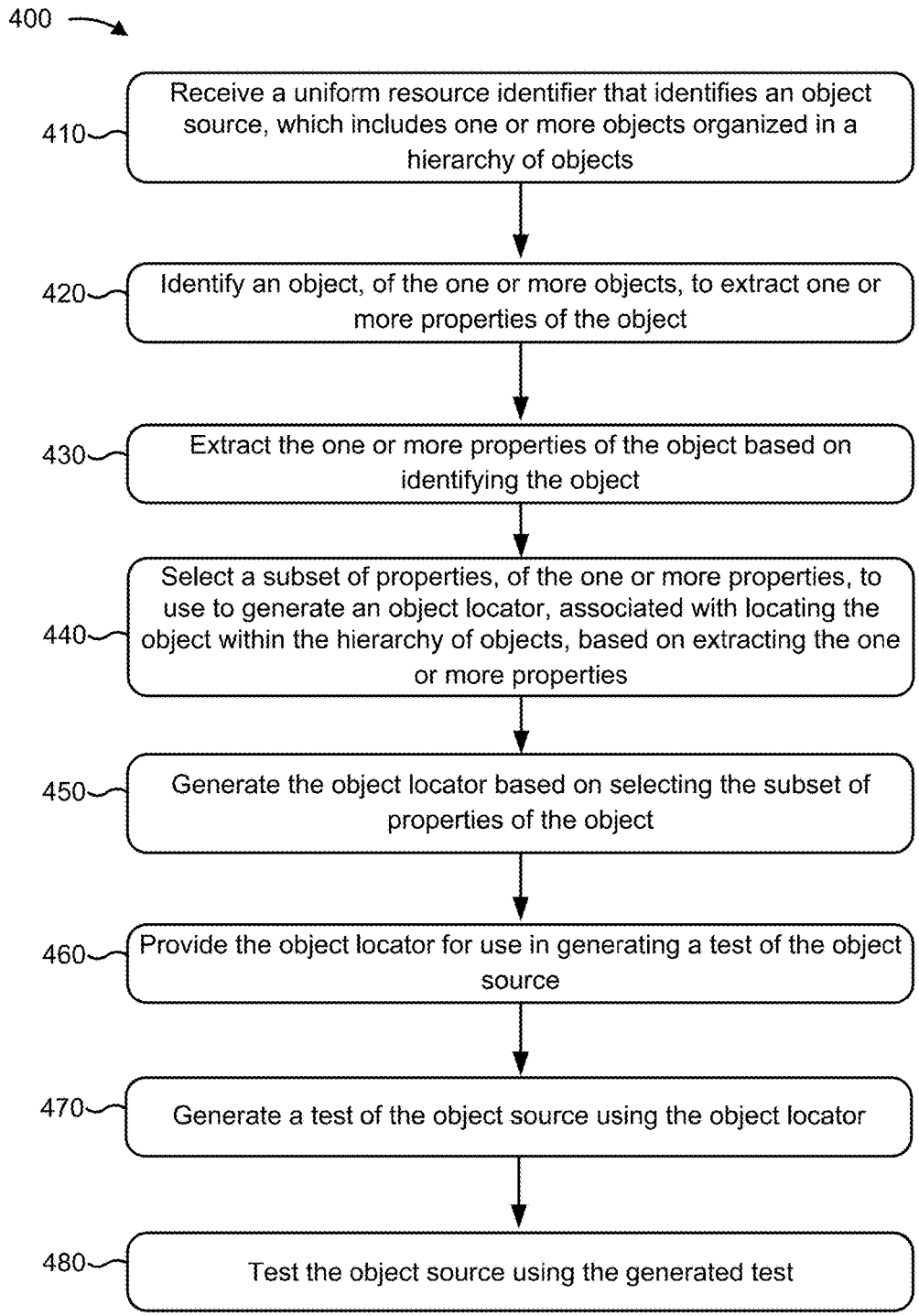
FIG. 4 is a flow chart of an example process for automatically generating object locators for automation test generation.

FIG. 4 is a flow chart of an example process 400 for automatically generating object locators for automation test generation. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving a uniform resource identifier that identifies an object source, which includes one or more objects organized in a hierarchy of objects (block 410). For example, client device 210 may receive a uniform resource identifier (URI) (e.g., a uniform resource locator (URL), a uniform resource name (URN), a file name, a network address, etc.) from another device or from a user of client device 210. In some implementations, the URI may identify an object source. For example, the URI may identify a webpage, a hypertext markup language (HTML) document, an extensible markup language (XML) document, or an extensible hypertext markup language (XHTML) document. Additionally, or alternatively, the object source may include a first object source within a second object source, such as a child window of a webpage or an iFrame of an HTML document.

In some implementations, the object source may include an object (e.g., an element of an object source). For example, the object source may include an input object, such as a text box, a label object, an image object, a button object, or a hyperlink object. In some implementations, the object source may include multiple objects organized into a document object model (DOM) tree (e.g., a hierarchical structure of the multiple objects). In some implementations, client device 210 may identify the object source as a source of objects for which object locators are to be generated based on receiving the URI. Additionally, or alternatively, client device 210 may identify the object source as an object source to be tested based on receiving the URI.

As further shown in FIG. 4, process 400 may include identifying an object, of the one or more objects, to extract one or more properties of the object (block 420), extracting the one or more properties of the object based on identifying the object (block 430), and selecting a subset of properties, of the one or more properties, to use to generate an object locator, associated with locating the object within the hierarchy of objects, based on extracting the one or more properties (block 440). For example, client device 210 may identify an object associated with the object source. In some implementations, client device 210 may identify the object to extract one or more properties of the object.

In some implementations, the object may include a property that describes the object. For example, a property of the object may include an object identifier that identifies the object or a name identifier that identifies a name of the object. As another example, the property of the object may include a tag identifier that identifies a tag of the object, such as a form tag, an input tag, a button tag, or a label tag. As another example, the property of the object may include a type identifier that identifies a type of the object, such as an email type input object, a password type input object, or a button type object. In some implementations, the property of the object may include an attribute (e.g., a value of the property, such as a string of characters or a number).

In some implementations, client device 210 may identify a technique for identifying an object in an object source. For example, client device 210 may identify a bulk identification technique or a single-selection identification technique for identifying the object. In some implementations, the bulk identification technique may cause client device 210 to identify multiple objects, such as multiple objects for a particular type, tag, or path (e.g., an expression for navigating a hierarchy of objects), for extraction of the properties of the multiple objects. In some implementations, the single-selection identification technique may cause client device 210 to identify a single object of the object source, for extraction of the properties of the object.

In some implementations, the single-selection identification technique may include a user-selection identification technique. For example, the single-selection identification technique may include client device 210 identifying particular objects of the object source based on a user selecting the particular objects (e.g., using a mouse, a touch screen, or another type of input component of client device 210). Using a single-selection technique may conserve computing resources of client device 210 by reducing a quantity of objects that client device 210 identifies.

In some implementations, client device 210 may identify the identification technique based on the object source. For example, client device 210 may identify a bulk identification technique when the object source is an HTML document (e.g., based on HTML using standardized tags) and may identify the single-selection technique when the object source is an XML document. As another example, client device 210 may use the bulk identification technique for a first portion of an object source, such as an HTML portion, and the single-selection technique for a second portion of the object source, such as an XML portion.

In some implementations, client device 210 may identify the technique based on a quantity of objects included in the object source. For example, client device 210 may identify the bulk identification technique for an object source that includes a quantity of objects of a particular type or tag greater than a threshold quantity and may identify the single-selection technique for an object source for that includes a quantity of objects of a particular type or tag less than the threshold quantity.

In some implementations, client device 210 may identify the identification technique based on the types of the objects included in the object source. For example, client device 210 may identify the bulk identification technique for a first type of object, such as an input object, and may identify the single-selection identification technique for a second type of object, such as an image object. In some implementations, client device 210 may identify the identification technique based on input from a user. For example, client device 210 may identify the identification technique based on the user selecting the bulk identification technique or the single-selection identification technique (e.g., by using a user interface provided for display by client device 210).

In some implementations, client device 210 may extract properties of an object associated with the object source based on identifying the object. For example, client device 210 may extract the properties of an object based on identifying the object using an identification technique. In some implementations, client device 210 may extract all properties of the object. In some implementations, client device 210 may extract a subset of the properties of the object (e.g., by extracting particular properties of the object, rather than extracting all properties of the object), thereby conserving computing resources of client device 210 by reducing a quantity of properties that client device 210 extracts.

In some implementations, client device 210 may select a subset of properties from the extracted properties. For example, client device 210 may select properties that, when used to generate the object locator, may increase an accuracy of locating the object (e.g., rather than using any extracted property, such as via random selection, and/or using all of the extracted properties to generate the object locator).

In some implementations, client device 210 may apply a rule when selecting the subset of properties to use to generate the object locator. In some implementations, client device 210 may apply a rule associated with using or not using a property and/or a particular combination of properties to generate the object locator. For example, client device 210 may apply a rule that prevents client device 210 from using particular combinations of object identifiers and/or class identifiers to generate the object locator.

Additionally, or alternatively, client device 210 may apply a rule that indicates a weight (e.g., a heavy, moderate, or light weight), a score (e.g., a high, medium, or low score), or a priority (e.g., a high, medium, or low priority) for different properties when selecting the subset of properties to use to generate the object locator. For example, client device 210 may apply a rule that assigns a high priority to properties for the subset of properties that uniquely identify the object and that assigns a low priority to properties that do not uniquely identify the object.

In this way, client device 210 may select a subset of properties for generating an object locator. This enables client device 210 to select properties that more accurately identify the object within a hierarchy of objects, thereby improving object locators that client device 210 generates. In addition, this conserves memory resources of client device 210 by reducing a quantity of properties that client device 210 may store or cache to enable client device 210 to generate the object locators.

As further shown in FIG. 4, process 400 may include generating the object locator based on selecting the subset of properties of the object (block 450). For example, client device 210 may generate an object locator that uniquely identifies the object or indicates a path for locating the object within the DOM tree. In some implementations, client device 210 may use the properties extracted from the object source to generate the object locator.

In some implementations, the object locator may be based on a property of the object. For example, the object locator may be based on a property that uniquely identifies the object, such as an object identifier or a name identifier. As another example, the object locator may be based on a type identifier of the object, a source identifier (e.g., a URI) of the object, a value of the object (e.g., such as a value of an input object), or text associated with the object, such as text displayed on a user interface.

In some implementations, the object locator may be based on a combination of properties of the object. For example, the object locator may be based on a combination of a type identifier that identifies the object as a button object and a source identifier that identifies the source of the object as an image (e.g., based on the source identifier including a .jpeg or .png file extension). In some implementations, client device 210 may generate the object locator based on a combination of properties where the combination uniquely identifies the object within the object source.

In some implementations, client device 210 may use a particular property to generate an object locator for a particular object. For example, client device 210 may use a type identifier to generate an object locator for an image type object. As another example, client device 210 may use a type identifier to generate an object locator for an input type object. As another example, client device 210 may use a value to generate an object locator for a button type object. As another example, client device 210 may use a name identifier to generate an object locator for a radio button type object. This enables client device 210 to improve generation of object locators by using properties that result in object locators that more accurately identify a location of the object in the object source (e.g., relative to using other properties).

In some implementations, generating the object locator may include generating a path for locating the object in a hierarchy of objects of the object source. For example, client device 210 may generate a path to locate the object within a DOM tree. In some implementations, client device 210 may generate an absolute XML path (xpath) when generating a path for the object. For example, client device 210 may generate an absolute xpath using a name identifier of the object. Additionally, or alternatively, client device 210 may generate a relative xpath when generating a path for the object. For example, client device 210 may generate a relative xpath using a name identifier of the object. As another example, client device 210 may generate a relative xpath using an object identifier and/or a class identifier of the object.

In some implementations, client device 210 may generate an object locator for a first object and may use the object locator for the first object to locate a second object. For example, client device 210 may generate an object locator for locating a label object, based on the label object including the text "username," and may use the object locator for the label object to locate a second object, such as an input object for inputting a username.

In some implementations, client device 210 may locate an object based on another object that is proximate to the object. In some implementations, using an object locator for a first object to locate a second object may include using the object locator to locate a second object that is proximate to the first object (e.g., within a threshold quantity of pixels of the first object when displayed, closest to the first object when displayed relative to other objects, etc.). For example, client device 210 may use an object locator for a username label object to locate the username label object and then may locate a username input object by locating an input object that is proximate to the username label object.

In some implementations, client device 210 may generate the object locator based on the hierarchy of objects of the object source. For example, client device 210 may generate an object locator for a first object based on identifying a second object that is in a parent, sibling, or child relationship with the first object in the hierarchy of objects. Generating an object locator for a first object that can be used to locate a second object conserves computing and/or memory resources of client device 210 by reducing a quantity of object locators that client device 210 has to generate and/or store.

In some implementations, client device 210 may generate the object locator using a combination of techniques. For example, client device 210 may generate the object locator using a combination of a property of the object, a path of the object, a first object that is proximate to a second object, and/or a hierarchical relationship between a first object and a second object. In this way, client device 210 may increase an accuracy of the generated object locator by using a combination of techniques to generate an object locator that more accurately identifies a location of the object in the object source (e.g., relative to using a single technique for generating the object locator). This conservers computing resources of client device 210 when client device 210 uses the generated object locators to test an object source by reducing or eliminating use of object locators that inaccurately identify the objects of the object source, as described below.

In some implementations, client device 210 may apply a rule associated with using a technique to generate the object locators. In some implementations, client device 210 may apply a rule that indicates a weight, a score, or a priority associated with using a technique to generate the object locators. For example, the rule may indicate a higher priority for generating object locators using a single property (e.g., rather than using combinations of properties and/or paths to generate the object locators). Using a single property to generate the object locator conserves computing and/or processor resources of client device 210 by reducing the quantity of properties client device 210 uses to generate the object locators. In addition, this conserves computing and/or processor resources of client device 210 by enabling client device 210 to more quickly and/or efficiently generate the object locators.

As another example, the rule may indicate a higher priority for generating object locators that can be used with a dynamic object source (e.g., a relative xpath) rather than object locators that can only be used with a static object source (e.g., an absolute xpath). This conserves computing resources of client device 210 by reducing or eliminating the need for client device 210 to regenerate object locators for an object when the object source changes (e.g., the hierarchy of objects changes or a different object source is used as the object source).

In some implementations, client device 210 may permit a user to interact with the object locator generated for the object. For example, client device 210 may permit a user to customize and/or modify the object locator after generating the object locator. As another example, when client device 210 generates multiple object locators for an object, client device 210 may permit the user to select a particular object locator, of the multiple object locators, to use when generating the tests. As another example, client device 210 may permit the user to assign a weight, a score, or a priority to the multiple object locators for use when generating the tests.

As further shown in FIG. 4, process 400 may include providing the object locator for use in generating a test of the object source (block 460). For example, client device 210 may provide the object locator to another device, such as server device 220. In some implementations, client device 210 may provide the object locator to enable generation of a test of the object source.

In some implementations, client device 210 may export the object locator and/or properties of the object. For example, client device 210 may export the object locator and/or the properties to a file, such as an XML file or a spreadsheet file (e.g., an Excel spreadsheet file or a comma-separated values (CSV) file). As another example, client device 210 may export the object locator and/or the properties to a program different from the program used to identify the object and/or to generate the object locator. Exporting the object locator and/or the properties of the object enables cross-platform (e.g., multi-platform) use of the object locator for generating tests (e.g., use by different programs to generate tests). For example, client device 210 may export the object locator and/or the properties in a manner that enables the object locator and/or the properties to be compatible with different client devices 210, different programs, different web browsers, etc.

This conserves computing resources by reducing or eliminating the need for client device 210 to regenerate the object locator when different client devices 210 are used to generate the test and/or when different programs or web browsers are used to identify and generate the test of the object source. In addition, this enables offline use of the object locator, thereby increasing an efficiency of using the object locator by reducing or eliminating the need for client device 210 to be in communication with another device or network 230 to use the object locator. Further, this enables portability of the object locator, such as to another client device 210, thereby conserving computing resources by reducing or eliminating the need for the other device to generate the object locator.

In some implementations, client device 210 may store the object locator. For example, client device 210 may store the object locator in an object repository. In some implementations, client device 210 may store the object locator in association with generating the object locator. In some implementations, client device 210 may modify and/or permit a user to modify the object locator stored in the object repository. For example, client device 210 may edit and/or permit the user to edit the object locator to generate a new object locator, thereby conserving computing resources of client device 210 by enabling reuse an existing object locator to generate a new object locator.

Additionally, or alternatively, client device 210 may import an object locator from another object repository. In some implementations, client device 210 may export the object repository, such as to another object repository. In this way, client device 210 may merge multiple object repositories, thereby enabling client device 210 to use a single object repository to store object locators. This conserves memory resources by reducing or eliminating duplicate and/or redundant storage of object locators. In addition, this increases an efficiency of maintaining the object locators by reducing or eliminating the need for duplicate and/or redundant efforts by a user to maintain the object locators.

As further shown in FIG. 4, process 400 may include generating a test of the object source using the object locator (block 470) and testing the object source using the generated test (block 480). For example, client device 210 may generate test steps for testing the object source. In some implementations, client device 210 may use the object locator when generating a test step to indicate a particular object, of the object source, to which a particular test step applies and/or to direct execution of the test step to the particular object. For example, assume that a test step includes inputting a username into a username input object. Client device 210 may generate a test step that includes an object locator associated with the username input object to enable client device 210 to identify the username input object in the object source and to input a value into the username input object.

In some implementations, client device 210 may test the object source using the generated test. For example, client device 210 may test the object source by passing values to a an input object, reading values output via an object, selecting a button object, or selecting a menu item from a dropdown menu object. In some implementations, client device 210 may determine a result of the test. For example, client device 210 may determine whether the test resulted in a successful sign in to a webpage or whether the test generated an expected output.

In some implementations, client device 210 may test an object locator and/or properties of an object based on exporting the object locator and/or the properties. For example, client device 210 may test the object locator and/or the properties using an XML file or a spreadsheet file that includes an exported object locator and/or exported properties.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a client device to automatically extract properties of objects from an object source and selectively use the properties to generate object locators for the objects. This conserves computing and/or memory resources by reducing a quantity of object locators that the client device generates and/or stores. In addition, this increases an efficiency of testing the object source by enabling the client device to select and use properties that enable generation of more accurate object locators (e.g., relative to using other properties to generate the object locators), thereby conserving computing resources that would otherwise be used to inaccurately identify objects during testing.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive a uniform resource identifier that identifies an object source,
the object source including one or more objects organized in a hierarchy of objects;
identify an identification technique based on a type of the one or more objects,
a first identification technique being identified based on the one or more objects being a first type, or
a second identification technique being identified based on the one or more objects being a second type;
identify a first object, of the one or more objects, using the identification technique to permit extraction of one or more properties of the first object;
extract the one or more properties of the first object based on identifying the first object;
select a subset of properties, of the one or more properties, to use to generate an object locator based on extracting the one or more properties,
the object locator being associated with locating the first object in the hierarchy of objects;
generate the object locator based on selecting the subset of properties;
use the object locator to locate a second object that is within a threshold quantity of pixels of the first object;
provide the object locator to permit the device to generate a test of the object source;
generate the test of the object source using the object locator; and
test the object source using the test.

2. The device of claim 1, where the one or more processors are further to:
apply a first rule that permits the device to select a particular property or a particular combination of properties as the subset of properties, or
apply a second rule that prevents the device from selecting the particular property or the particular combination of properties as the subset of properties; and
where the one or more processors, when selecting the subset of properties, are to:
select the subset of properties based on applying the first rule or applying the second rule.

3. The device of claim 1, where the one or more processors are further to:
apply a rule that indicates a weight, a score, or a priority associated with selecting a particular property or a particular combination of properties as the subset of properties; and
where the one or more processors, when selecting the subset of properties, are to:
select the subset of properties based on applying the rule.

4. The device of claim 1, where the one or more processors, when generating the object locator, are to:
generate the object locator based on:
a property that identifies the first object,
a combination of properties that identify the first object,
a path that identifies a location of the first object within the hierarchy of objects,
a hierarchical relationship associated with the first object, or
another object that is proximate to the first object.

5. The device of claim 1, where the one or more processors, when identifying the first object, are to:
identify the first object based on receiving an indication to identify the first object, or
identify the first object based on receiving an indication to identify multiple objects using the one or more properties of the multiple objects.

6. The device of claim 1, where the one or more processors are further to:
export the object locator to an extensible markup language (XML) file or a spreadsheet file; and
where the one or more processors, when generating the test of the object source, are to:
generate the test of the object source using the XML file or the spreadsheet file.

7. The device of claim 1, where the object locator is a first object locator; and
where the one or more processors are further to:
generate a second object locator associated with the second object; and
provide the second object locator to permit the device to generate the test of the object source.

8. The device of claim 1, where the test is a first test; and
where the one or more processors are further to:
provide the object locator to another device to generate a second test of the object source.

9. A non-transitory computer-readable medium storing instructions, the instructions comprising:
one or more instructions that, when executed by one or more processors of a device, cause the one or more processors to:
receive one or more uniform resource identifiers that identify one or more object sources,
the one or more object sources including at least one object, of one or more objects, that represents at least one element of the one or more object sources,
the one or more objects being hierarchically related;
identify one or more identification techniques based on one or more types of the one or more objects,
a first identification technique, of the one or more identification techniques, being identified based on at least one of the one or more objects being a first type, or
a second identification technique, of the one or more identification techniques, being identified based on at least one of the one or more objects being a second type;
identify a first object, of the one or more objects, using the one or more identification techniques to identify the first object;
extract one or more properties of the first object based on identifying the first object using the one or more identification techniques to identify the first object;
select a subset of properties, of the one or more properties, to use to generate an object locator based on extracting the one or more properties,
the object locator enabling the device to identify the first object in the one or more object sources;
generate the object locator using the subset of properties of the first object;
use the object locator to locate a second object that is within a threshold quantity of pixels of the first object;
provide the object locator to permit the device to generate a test of the one or more object sources;
generate the test of the one or more object sources using the object locator; and
test the one or more object sources using the test.

10. The non-transitory computer-readable medium of claim 9, where the one or more instructions, when executed by the one or more processors, further cause the one or more processors to:
apply a rule that identifies a property, or a combination of properties, of the one or more properties, to use to generate the object locator; and
where the one or more instructions, that cause the one or more processors to select the subset of properties, cause the one or more processors to:
select the subset of properties based on applying the rule.

11. The non-transitory computer-readable medium of claim 9, where the one or more instructions, when executed by the one or more processors, further cause the one or more processors to:
apply a rule that identifies properties, of the one or more properties, to include in the subset of properties based on a weight, a score, or a priority associated with the one or more properties; and
where the one or more instructions, that cause the one or more processors to select the subset of properties, cause the one or more processors to:
select the subset of properties based on applying the rule.

12. The non-transitory computer-readable medium of claim 9, where the one or more instructions, that cause the one or more processors to identify the first object, cause the one or more processors to:
identify a single-selection identification technique; and identify the first object using the single-selection identification technique.

13. The non-transitory computer-readable medium of claim 9, where the one or more instructions, when executed by the one or more processors, further cause the one or more processors to:
   identify a bulk identification technique; and
   where the one or more instructions, that cause the one or more processors to identify the first object, cause the one or more processors to:
      identify multiple objects using the bulk identification technique,
      the multiple objects including the first object.

14. The non-transitory computer-readable medium of claim 9, where the one or more instructions, that cause the one or more processors to provide the object locator, further cause the one or more processors to:
   provide the object locator
      in a manner that enables the object locator to be used with:
         different devices,
         different programs, or
         different web browsers.

15. The non-transitory computer-readable medium of claim 9, where the one or more uniform resource identifiers identify:
   a webpage,
   a hypertext markup language (HTML) document,
   an extensible markup language (XML) document, or
   an extensible hypertext markup language (XHTML) document.

16. A method, comprising:
   receiving, by a device, a uniform resource identifier that identifies an object source,
      the object source including one or more objects;
   identifying, by the device, an identification technique based on a type of the one or more objects,
      a first identification technique being identified based on at least one of the one or more objects being a first type, or
      a second identification technique being identified based on at least one of the one or more objects being a second type;
   identifying, by the device, a first object, of the one or more objects, using the identification technique to permit extraction of one or more properties of the first object;
   extracting, by the device, the one or more properties of the first object based on identifying the first object;
   selecting, by the device, a subset of properties, of the one or more properties, using a rule,
      the rule being associated with determining whether a property, of the one or more properties, can be used to generate an object locator that identifies a location of the first object in the object source;
   generating, by the device, the object locator based on selecting the subset of properties;
   using, by the device, the object locator to locate a second object that is within a threshold quantity of pixels of the first object;
   providing, by the device, the object locator to permit the device to generate a test of the object source;
   generating, by the device, the test of the object source using the object locator; and
   testing, by the device, the object source using the test.

17. The method of claim 16, further comprising:
   determining that the property can be used to identify the first object, or
   determining that the property cannot be used to identify the first object; and
   selectively including the property in the subset of properties based on determining that the property can or cannot be used to identify the first object.

18. The method of claim 16, where the object locator is associated with at least one of:
   a property of the first object that identifies the first object,
   a combination of properties that identify the first object,
   a path that identifies a location of the first object within a hierarchy of objects,
   a hierarchical relationship associated with the first object, or
   another object that is proximate to the first object.

19. The method of claim 16, where generating the test comprises:
   generating one or more test steps to test the object source,
      the one or more test steps including the object locator; and
   where testing the first object comprises:
      testing the first object using the one or more test steps.

20. The method of claim 16, where providing the object locator further comprises:
   exporting the object locator to permit the object locator to be used by a different device or a different program to test the object source.

* * * * *